P. N. GOUX.

Improvement in Deodorizing Excrements.

No. 119,756. Patented Oct. 10, 1871.

UNITED STATES PATENT OFFICE.

PIERRE NICOLAS GOUX, OF RUE DE LONGCHAMPS, PARIS, FRANCE.

IMPROVEMENT IN DEODORIZING EXCREMENTS.

Specification forming part of Letters Patent No. 119,756, dated October 10, 1871.

*To all whom it may concern:*

Be it known that I, PIERRE NICOLAS GOUX, of Rue de Longchamps, Paris, in France, have invented Improvements in Collecting and in Disinfecting Human Excreta and converting the same into manure; also, in the apparatus or means employed therein, of which the following is a specification:

My said invention has for its object the collection of human excreta and the conversion of the same, while in the receptacles in which it is collected, into a valuable manure in a simple and efficacious manner.

In carrying out my invention I employ a peculiar system of manure-producing closet, cesspool, or receptacle, in which I effect the immediate and complete absorption of the gases and liquids contained in the fecal matters by means of absorbent substances, which are applied to the bottom and sides of my receptacles before the fecal matters are deposited therein. I employ, in preference to fixed cess-pools, movable receptacles, lined either by hand, or by means of molds in order to expedite the operation, with agents capable of absorbing the liquids and metallic salts and of fixing the fertilizing gases. I shall hereinafter give a list of the different materials or substances which I utilize for the purpose of fixing the fertilizing gases, which substances are selected as being of themselves useful for vegetation, while serving, at the same time, for the reception, preservation, disinfection, and solidification of the excreta. By means of my process the nuisance resulting from the emptying of cess-pools is avoided, and an extremely powerful and valuable manure is obtained which may be used with as much facility as any of those hitherto employed. I may observe also, that, according to my system, the emptying of the receptacle and the production of manure are effected by the same operation, without filtering or separating the matters, the whole of which are subsequently utilized, no portion being rejected.

And in order that my said invention may be fully understood I shall now proceed more particularly to describe the same, and for that purpose shall refer to the several figures on the annexed drawing, the same letters of reference indicating corresponding parts in all the corresponding figures.

Figure 1:
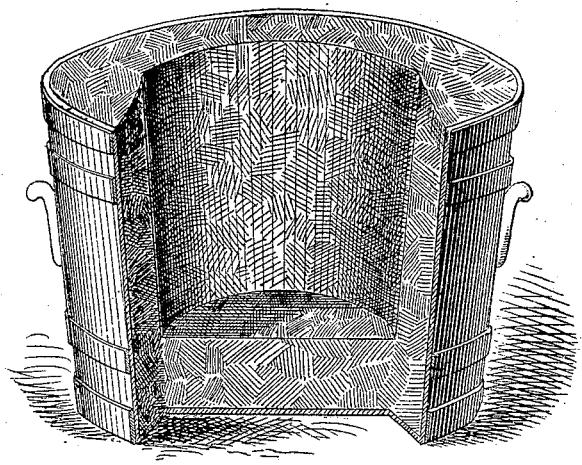
Figure 2:
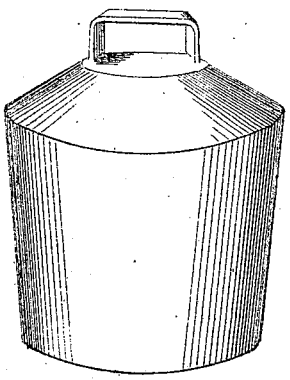

Figure 1 is a perspective view, in part sectional, of a receptacle for excreta, furnished with absorbent material and prepared for use. Fig. 2 is a perspective view of a mold used in placing the absorbent material within the receptacle.

*a* represents the receptacle or vessel. *b* represents the absorbent materials disposed in the receptacles or vessels *a*. *c* is the mold, and *d* its cover and handle. *e* are the handles of the receptacle *a*.

The vessel or receptacle *a* is prepared or lined with the absorbent material substantially in the following manner: I first throw into and press upon the bottom of the empty vessel a suitable quantity of the absorbent materials, which quantity forms the foundation, and upon which I place the mold *c*. I then fill the space between the exterior of the mold *c* and the inner walls of the receptacle *a* with the absorbent material *b*, which I tramp or press sufficiently to form a compact wall or lining within the vessel *a*. I then withdraw the mold *c*, which leaves the interior of the receptacle *a* lined or walled with the absorbent material *b*, and the receptacle is then ready for use. After the receptacle thus prepared has been filled with excreta, or used so long that the absorbent material is so fully charged as to be unfit for further duty, the charged absorbent material is removed by turning over the receptacle and dumping out the contents. A new lining of absorbent material is then placed within the receptacle, in the manner before described.

As hereinbefore stated, the object of my process is to immediately and completely absorb the gases and liquids contained in the feces, and then to preserve them from the action of the oxygen of the air in order to prevent their fermentation, which produces noxious gases. This absorption and fixation is accomplished by simply depositing the excreta within the interior of the said absorbent lining *b*. In the compounding or formation of the said absorbent material I make use, in suitable proportions, of chemical agents which have been already employed for this purpose, such as sulphate of iron, of zinc, or of lime, and of others which I shall hereinafter mention. Then, in order to prevent the contact of the air and avoid fermentation, I employ any species of pulverulent bodies, giving the preference to such as from their nature are capable by themselves of forming a manure. These matters may be of both an absorbent, antiseptic, and disinfectant nature; even the agents used for fixing the gases may form, when it is practicable so to utilize them, an integral part of the absorbents. These matters which are requisite for the mechanical part of the operation will, in almost every case, act as fertilizing agents. These matters may be applied under many forms: they may be more or less divided, cut, or pulverized, disintegrated or dissolved, employed in their natural or manufactured condition, and used in a dry or wet state, as required.

I shall now indicate some of the mineral, animal, vegetable, or mixed substances which, when placed in the receptacles, will directly absorb the liquids of the feces and fix their gases. I may mention the following substances as having been found to give good results in practice: Straw of all kinds; husks; straws and dust from winnowing-machines; the refuse and sweepings of grain-mills; residues of straw and fodder-lofts; stable-litter and straw from dung-heaps; vegetable mold; dry garden-mold; road-dust or sweepings; wood-ashes; cotton-waste of spinning-mills; the waste or dust arising from the operation of carding animal or vegetable textile materials; sea-weed or wrack; fodder from natural or artificial meadows; reeds of the gladiolus; ferns, mosses, lichens, heaths; house, office, and workshop sweepings; old papers; mud or dirt from town sweepings; paper, straw, or hay from packages; feathers and waste of feathers; soap-boilers' waste or lixivium ashes; carpenters' shavings; flesh and blood dried and disinfected; bone-powder carbonized and pulverized; wool; woolen rags; dust from rolling-mills; cloth-shearings; hair; also dust, raspings, waste clippings of horns and hoofs; short hairs and wastes from tan-yards; residue of fat or greaves; clippings of hides; glue residues; residuum obtained in the manufacture of Prussian blue; oil-cakes of all oleaginous grains or fruits; saw-dust; tan or tan-waste; charcoal, pulverized, powdered, or whole, under all its different degrees and modes of preparation, and produced by all carbonizable vegetables; dung; leaves of all vegetables; solid excreta of all domestic animals; stable refuse; residuum of expressed grapes, apples, or perry; brewers' mash; residuum from starch-works and sugar refineries in every state.

I may here state that I may also employ the vegetable substances hereinbefore described in a fresh or green state.

Among the mineral substances I may mention the sulphates of iron, copper, baryta, lead, ammonia, zinc, potash, soda, magnesia, and alumina or alum; sulphate of lime; chloride of manganese and of magnesium; carbonate of lime or chalk; carbonate of lead or white lead; nitrate of lead; pyrolignite of iron; acetate of protoxide and of sesquioxide of iron; acetate of lead; empyreumatic oils; petroleum; nitric acid; chlorhydric acid; black and red pyritous ashes of every description; coal, wood, and peat-ashes; carbonized earth; rich aluminous carbonized clay; carbonized or dried alumina; wet clay; soot; peat, carbonized or in its natural condition; lime; phosphate of lime; coprolite, apatite, or phosphorite; sulphate of lime; vitrifiable earth; silicate of soda, feldspar, magnesia; nitrates of soda, potash, and magnesia; ammoniacal salts; chloride of sodium; gas-tar, either in its natural state or carbonized; sulphuric and phosphoric acid; protoxide and peroxide of iron.

In order to collect and absorb the fecal matters I previously dispose the absorbents hereinbefore described in receptables made of wood, metal, or other suitable materials, reserving to myself the right to vary the form and size to suit the positions or the requirements of the operation.

Figs. 1 and 2 show the description of receptacle which I prefer to employ. It will be observed that the interior is lined with pulverulent matters $b$, which are pressed in so as to form a lining, which prevents the immediate contact of the fecal matters with the sides or bottom of the receptacle $a$. The absorbent materials are placed in the receptacle by hand or by means of a metal mold or mandrel, $c$, provided with a slightly-conical lid or cover, which facilitates the introduction of the different substances employed for the absorption of the liquid or gaseous bodies, and which are thus rammed in with facility, so as to assume the external form of the mandrel. These molds or mandrels may obviously be made of any suitable material, and be of corresponding form to the receptacle required to be lined.

It will be observed that my receptacles are provided with handles $e$, by which to lay hold of them in order to place them on carts to convey them when required.

The various absorbents hereinbefore mentioned may also be applied to ordinary portable utensils or receptacles.

I reserve to myself the right to employ also as urinals my receptacles lined with absorbents by providing them with lips to conduct the urine therein.

It is obvious that the external form and method of operation of my apparatus may be modified, and that such means of transport may be employed for the receptacles and the solid and liquid matters, whether separate or mixed together, as circumstances may suggest.

It will be readily seen that by the system or method hereinbefore described a manure may be produced of a considerable fertilizing power, while the salubrity of the dwellings and towns where this system is applied is insured, as fermentation is entirely prevented by the putrescible matters being preserved from contact with the air.

Having now described and particularly ascertained the nature of my said invention, and the manner in which the same is or may be used or carried into effect, I would observe in conclusion that what I consider to be novel and original, and therefore claim as my invention, is—

The lining, with the said aborbents or their equivalents, by the aid of molds or mandrels or otherwise, the interior of the vessels or receptacles intended to receive human excreta, substantially as hereinbefore described.

In testimony whereof I have signed my name to this specification in the presence of two subscribing witnesses.

P. N. GOUX.

Witnesses:
   I. C. NEWBURN,
   F. N. TARGET.